UNITED STATES PATENT OFFICE.

G. F. GOETZE, OF NEW YORK, N. Y.

IMPROVED PAPIER-MACHÉ COMPOUND.

Specification forming part of Letters Patent No. 92,303, dated July 6, 1869.

*To all whom it may concern:*

Be it known that I, G. F. GOETZE, of the city, county, and State of New York, have invented a new and Improved Compound for Petrified Papier-Maché; and I do hereby declare the following to be a full, clear, and exact description thereof, which will enable those skilled in the art to make and use the same.

This invention relates to a compound of paper-pulp, glue, turpentine, oil, flour, and whiting, which ingredients are mixed together in such proportion and in such a manner that they form a plastic mass which can be readily introduced into molds and formed into articles of any desired shape, and which, after having been formed, will set in a short time and become petrified and capable of resisting the influence of moisture.

In preparing my compound I use the various ingredients in about the following proportions: Paper-pulp, five parts; glue, five parts; turpentine, two parts; oil, two parts; flour, four parts; whiting to suit the article to be produced. The glue is first dissolved in water, and the solution is mixed with the flour, turpentine, and oil, so as to form a thin paste. Into this paste the paper-pulp is introduced and the whole mass is intimately mixed, and after the paper-pulp has become thoroughly saturated with the paste I add a sufficient quantity of whiting to form a plastic mass, which is finally brought into the required form by molds or by any other suitable means. After the compound has been formed into articles of the desired shape said articles are left to dry, either in the open air, or they may be dried by artificial heat.

My compound is of particular value for statues or other ornaments, and when the same has dried it as hard as stone and capable of resisting the influence of moisture, so that articles made from the same can be exposed to the influence of the atmosphere without sustaining any injury.

Having thus described my invention, what I claim as new, and desire to secure by Letters Patent, is—

A compound for petrified papier-maché, made of the ingredients herein specified, and mixed together substantially in the manner and about in the proportion described.

This specification signed by me this 29th day of May, 1869.

G. F. GOETZE.

Witnesses:
E. F. KASTENHUBER,
C. WAHLERS.